W. W. MEDLEY.
CREAM EXTRACTOR.
APPLICATION FILED FEB. 7, 1917.
1,263,453.
Patented Apr. 23, 1918.
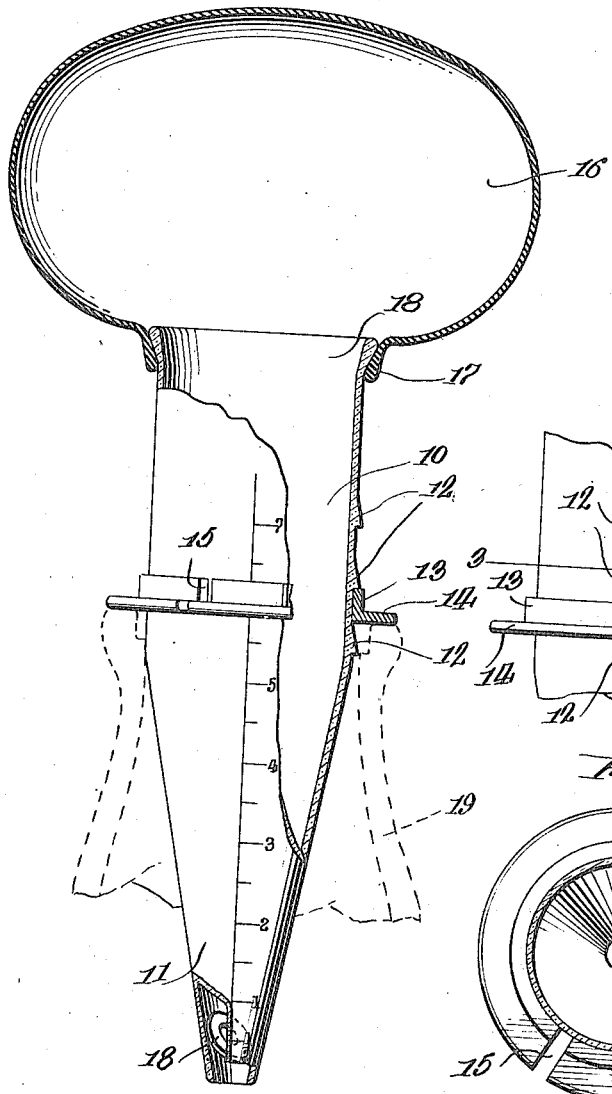
WITNESSES
Guy M. Spring
INVENTOR
William W. Medley
BY Richard Bowen.
ATTORNEY

UNITED STATES PATENT OFFICE.

WILLIAM W. MEDLEY, OF TERRE HAUTE, INDIANA.

CREAM-EXTRACTOR.

1,263,453.          Specification of Letters Patent.          Patented Apr. 23, 1918.

Application filed February 7, 1917. Serial No. 147,212.

*To all whom it may concern:*

Be it known that I, WILLIAM W. MEDLEY, a subject of the King of Great Britain, residing at Terre Haute, in the county of Vigo and State of Indiana, have invented certain new and useful Improvements in Cream-Extractors, of which the following is a specification.

This invention relates to an improved cream extractor and the principal object of the invention is to provide a cream extractor which may be inserted into a milk bottle a desired distance without the cream being spilled from the bottle by the insertion of the glass body of the extractor and to further provide an improved device for limiting the insertion of the extractor into the milk bottle, the abutment collar limiting the insertion of the extractor being adjustably mounted upon the body of the extractor.

Another object of the invention is to so construct the extractor that there will be no danger of cream leaking from the same when removing the extractor from the bottle.

This invention is illustrated in the accompanying drawings, wherein:—

Figure 1 is a view showing the improved extractor in operative position and shown partially in elevation and partially in section.

Fig. 2 is a fragmentary view in elevation of the extractor with the abutment collar in place.

Fig. 3 is a transverse sectional view taken along the line 3—3 of Fig. 2.

This extractor is provided with a tubular body 10 which will preferably be formed of glass or some other transparent material and which will have a tapered lower end portion 11, the lower portion of the extractor body being tapered so that the extractor may be inserted in a milk bottle without the cream at the top of the bottle being forced out of the bottle during the insertion of the extractor. This body 10 carries lugs or teeth 12 to engage the upstanding flange 13 of the abutment collar 14 and releasably hold the abutment collar in an adjusted position upon the tubular body. This collar will be formed of rubber, resilient metal or any other material having sufficient resiliency to permit the collar to tightly grip the tubular body when in place and if formed of metal will preferably be split as shown at 15 to permit of expansion and contraction. A head 16 which constitutes the suction device and will be formed of rubber is positioned at the top of the body 10 and is provided with a thickened neck 17 which when in place will tightly grip the flared upper end portion 18 of the body 10. Within the body there is placed a perforated disk 18, loosely mounted and permitting the cream to be sucked into or forced out of the body by the head or bulb 16 but preventing the cream from leaking out while transferring the device from the milk bottle to the cream receptacle.

When in use, the suction head 16 will be compressed to expel the air therefrom and the tubular body 10 will be inserted in the milk bottle shown in dotted lines and indicated by the numeral 19. The tapered lower end portion of this body will pass into the cream and due to its being tapered, the cream will not be forced out through the top of the bottle but will pass into the tubular body. The abutment collar 14 will previously have been adjusted to the proper position upon the tubular body according to the depth of the cream in the bottle or according to the amount it is desired to remove and when this abutment collar reaches the bottle, the extractor will be suspended in the bottle as shown in Fig. 1. The head 16 can then be released and the cream will be sucked up into the tubular body until the level of the cream reaches the lower end of the body. The extractor can then be removed from the bottle and the cream will be carried with it, the taper of the body providing a small opening thus doing away with danger of the cream dripping out through the body when the extractor is removed.

What is claimed is:—

1. A cream extractor comprising a hollow body having a tapered lower end portion terminating in an opening forming an inlet and an outlet, means for drawing cream into the body and forcing cream out of the body through the opening in the tapered lower end, and a check valve freely movable in the tapered lower end portion of the body and retarding expulsion of cream from the body when in an operative position.

2. A cream extractor comprising a tubular body, having a tapered lower end portion terminating in an opening, a valve disk loose in the tapered lower end portion of the tubular body and provided with an opening forming a restricted outlet when the valve is in an operative position, and means for sucking cream into the body and expelling the cream from the body through the opening of the valve element.

In testimony whereof I affix my signature in presence of two witnesses.

WILLIAM W. MEDLEY.

Witnesses:
EDWARD W. BENNETT,
M. H. KUTCH.